United States Patent
Xue et al.

(10) Patent No.: US 8,998,532 B2
(45) Date of Patent: Apr. 7, 2015

(54) RETENTION DEVICE FOR RETAINED SUBSTANCE AND RETENTION METHOD

(75) Inventors: Ziqiu Xue, Kizugawa (JP); Susumu Nishio, Tokyo (JP); Hiromichi Kameyama, Tokyo (JP); Koji Yoshizaki, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 0 days.

(21) Appl. No.: 14/008,779

(22) PCT Filed: Mar. 26, 2012

(86) PCT No.: PCT/JP2012/057686
§ 371 (c)(1),
(2), (4) Date: Sep. 30, 2013

(87) PCT Pub. No.: WO2012/133265
PCT Pub. Date: Oct. 4, 2012

(65) Prior Publication Data
US 2014/0072369 A1  Mar. 13, 2014

(30) Foreign Application Priority Data

Mar. 30, 2011 (JP) ................................. 2011-076149

(51) Int. Cl.
*B65G 5/00*  (2006.01)
*B65D 88/76*  (2006.01)
(Continued)

(52) U.S. Cl.
CPC . *B65G 5/00* (2013.01); *B01J 19/00* (2013.01); *C01B 31/20* (2013.01); *Y02C 10/14* (2013.01)

(58) Field of Classification Search
USPC ................ 405/53, 54, 129.1, 129.35, 129.45, 405/129.5, 129.57; 166/257, 259, 260, 261, 166/268, 270, 270.1, 270.2, 400, 401, 402, 166/403, 269, 275, 228, 229, 230, 231, 232, 166/233, 236
See application file for complete search history.

(56) References Cited

U.S. PATENT DOCUMENTS 400,884 A * 4/1889 Willbur ...................... 210/170.1
968,226 A * 8/1910 Ziller .............................. 405/45
(Continued)

FOREIGN PATENT DOCUMENTS

CA 2 768 437 A1 2/2011
JP A-2008-238054 10/2008
(Continued)

OTHER PUBLICATIONS

Oct. 8, 2013 International Preliminary Report on Patentability issued in International Application No. PCT/JP2012/057686.
(Continued)

*Primary Examiner* — Benjamin Fiorello
*Assistant Examiner* — Edwin Toledo-Duran
(74) *Attorney, Agent, or Firm* — Oliff PLC (57) ABSTRACT

A carbon dioxide tank (3) is connected to a pump device (5). The pump device (5) is joined and connected with an infusion well (9), which is a tubular body. The infusion well (9) extends downward beneath the ground (7) and is provided so as to reach a saltwater aquifer (11). Part of the infusion well (9) forms a horizontal well (10) in a substantially horizontal direction. In other words, the horizontal well (10) is a location in which part of the infusion well (9) is formed in a substantially horizontal direction within a saltwater aquifer (11). The horizontal well (10) is provided with filters (13), which are porous members. For the filters (13), for example, a fired member in which ceramic particles are mixed with a binder that binds those particles can be used. Moreover, if the hole diameter for the filters (13) is small, microbubbles with a smaller diameter can be generated.

10 Claims, 9 Drawing Sheets

(51) Int. Cl.
  *B09B 1/00*   (2006.01)
  *G21F 9/34*   (2006.01)
  *B01J 19/00*  (2006.01)
  *C01B 31/20*  (2006.01)

(56) References Cited

U.S. PATENT DOCUMENTS

| | | | | |
|---|---|---|---|---|
| 997,191 | A * | 7/1911 | Hogarth | 166/228 |
| 1,031,596 | A * | 7/1912 | Terrill | 166/205 |
| 1,062,717 | A * | 5/1913 | Layne | 166/228 |
| 1,146,499 | A * | 7/1915 | Jaszkowiak | 210/488 |
| 1,256,830 | A * | 2/1918 | Rodrigo | 166/228 |
| 1,406,825 | A * | 2/1922 | Dobson | 166/228 |
| 1,588,920 | A * | 6/1926 | Trahan et al. | 166/236 |
| 2,335,558 | A * | 11/1943 | Young | 166/228 |
| 2,392,263 | A * | 1/1946 | Records | 427/240 |
| 2,530,223 | A * | 11/1950 | Breaux | 166/228 |
| 2,796,939 | A * | 6/1957 | Woodruff | 166/228 |
| 2,905,251 | A * | 9/1959 | Church | 166/228 |
| 3,255,821 | A * | 6/1966 | Curlet | 166/380 |
| 3,357,564 | A * | 12/1967 | Medford, Jr. et al. | 210/266 |
| 3,361,203 | A * | 1/1968 | Rensvold | 166/376 |
| 4,434,054 | A * | 2/1984 | Livesey et al. | 210/484 |
| 4,445,574 | A * | 5/1984 | Vann | 166/268 |
| 4,501,326 | A * | 2/1985 | Edmunds | 166/272.3 |
| 4,821,800 | A * | 4/1989 | Scott et al. | 166/228 |
| 4,917,183 | A * | 4/1990 | Gaidry et al. | 166/278 |
| 5,004,049 | A * | 4/1991 | Arterbury | 166/228 |
| 5,088,554 | A * | 2/1992 | Arterbury et al. | 166/228 |
| 5,190,102 | A * | 3/1993 | Arterbury et al. | 166/228 |
| 5,219,028 | A * | 6/1993 | Martin et al. | 166/380 |
| 5,279,362 | A * | 1/1994 | Pool | 166/51 |
| 5,295,538 | A * | 3/1994 | Restarick | 166/205 |
| 5,310,000 | A * | 5/1994 | Arterbury et al. | 166/296 |
| 5,355,949 | A * | 10/1994 | Sparlin et al. | 166/236 |
| 5,664,628 | A * | 9/1997 | Koehler et al. | 166/369 |
| 5,664,911 | A * | 9/1997 | Bridges et al. | 405/128.4 |
| 5,738,170 | A * | 4/1998 | Lavernhe | 166/228 |
| 5,899,271 | A * | 5/1999 | Simone et al. | 166/230 |
| 5,909,773 | A * | 6/1999 | Koehler et al. | 166/277 |
| 6,015,011 | A * | 1/2000 | Hunter | 166/265 |
| 6,158,507 | A * | 12/2000 | Rouse et al. | 166/228 |
| 6,210,955 | B1 * | 4/2001 | Hayes | 435/262.5 |
| 6,325,152 | B1 * | 12/2001 | Kelley et al. | 166/370 |
| 6,390,192 | B2 * | 5/2002 | Doesburg et al. | 166/230 |
| 6,645,769 | B2 * | 11/2003 | Tayebi et al. | 436/56 |
| 6,805,202 | B2 * | 10/2004 | Gillespie et al. | 166/378 |
| 6,830,104 | B2 * | 12/2004 | Nguyen et al. | 166/278 |
| 6,941,652 | B2 * | 9/2005 | Echols et al. | 29/896.62 |
| 7,426,962 | B2 * | 9/2008 | Moen et al. | 166/306 |
| 7,690,097 | B1 * | 4/2010 | Cooper et al. | 29/447 |
| 7,762,341 | B2 * | 7/2010 | Hammer | 166/370 |
| 7,942,206 | B2 * | 5/2011 | Huang et al. | 166/373 |
| 8,251,138 | B2 * | 8/2012 | Bonner et al. | 166/230 |
| 8,474,531 | B2 * | 7/2013 | Nasr et al. | 166/272.4 |
| 2002/0033256 | A1 * | 3/2002 | Wellington et al. | 166/261 |
| 2002/0092649 | A1 * | 7/2002 | Bixenman et al. | 166/278 |
| 2004/0108279 | A1 * | 6/2004 | Tannenberg | 210/747 |
| 2005/0167103 | A1 * | 8/2005 | Horner et al. | 166/268 |
| 2006/0048942 | A1 * | 3/2006 | Moen et al. | 166/306 |
| 2008/0035330 | A1 * | 2/2008 | Richards | 166/228 |
| 2008/0128129 | A1 * | 6/2008 | Yeh et al. | 166/275 |
| 2009/0032251 | A1 * | 2/2009 | Cavender et al. | 166/269 |
| 2009/0062593 | A1 | 3/2009 | Bruno et al. | |
| 2009/0101342 | A1 * | 4/2009 | Gaudette et al. | 166/276 |
| 2009/0101356 | A1 * | 4/2009 | Johnson | 166/373 |
| 2009/0202304 | A1 * | 8/2009 | Koide et al. | 405/129.2 |
| 2010/0096120 | A1 * | 4/2010 | Ayasse | 166/55.1 |

FOREIGN PATENT DOCUMENTS

| | | |
|---|---|---|
| JP | A-2008-307483 | 12/2008 |
| JP | A-2010-036154 | 2/2010 |
| JP | A-2010-201330 | 9/2010 |
| WO | WO 2010/018844 A1 | 2/2010 |
| WO | WO 2010018844 A1 * | 2/2010 |
| WO | WO 2011/019053 A1 | 2/2011 |
| WO | 2011/032019 A2 | 3/2011 |

OTHER PUBLICATIONS

Dec. 3, 2014 Search Report issued in European Application No. 12763902.9—1610.

* cited by examiner

RETENTION DEVICE FOR RETAINED SUBSTANCE AND RETENTION METHOD

TECHNICAL FIELD

The present invention relates to a retention device and a retention method in order to retain a retained substance such as carbon dioxide in an underground saltwater aquifer.

BACKGROUND ART

Now, reducing the emission of carbon dioxide as a greenhouse effect gas to the atmosphere becomes a pressing need. In order to reduce the emission of carbon dioxide, not only the method of controlling the generation of carbon dioxide itself, but also the method of retaining carbon dioxide under the ground is examined.

Figure 9:
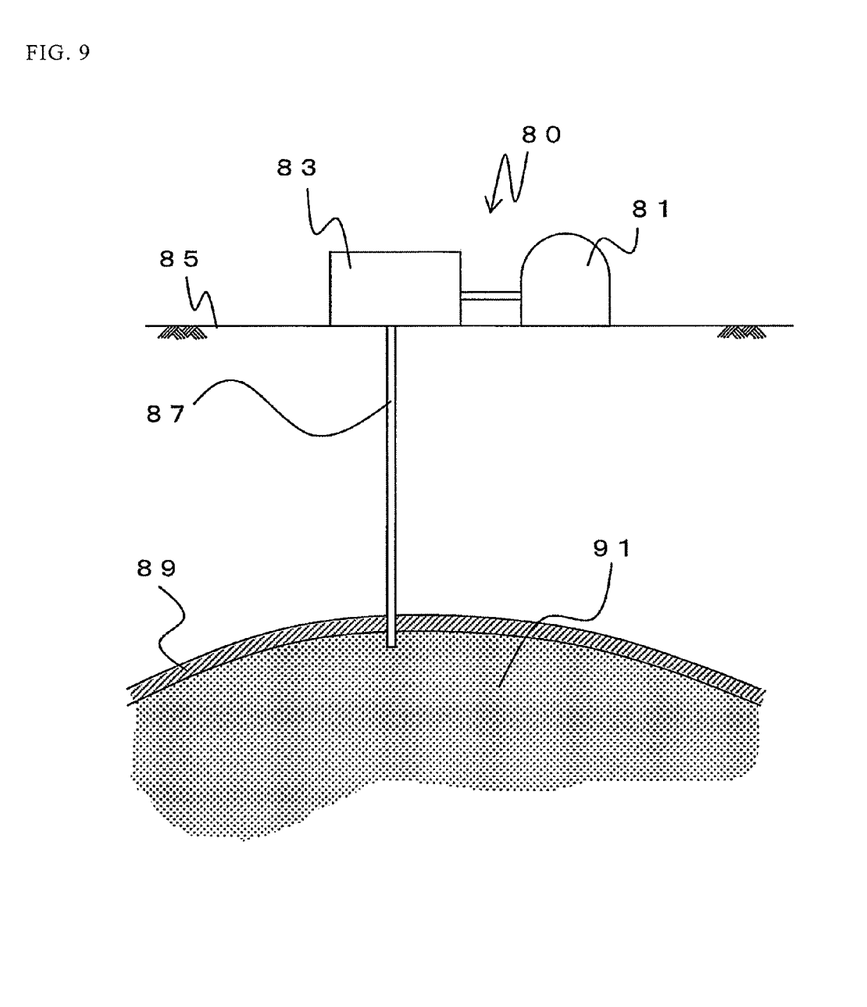
FIG. 9 A figure showing a carbon dioxide retention device 80

A method of retaining a lot of carbon dioxide on a scale of 1 million ton per year under the ground includes the method of infusing carbon dioxide into a stratum. FIG. 9 is a figure showing a conventional carbon dioxide retention apparatus 80. An infusion well 87 being a tube is extended to a retention layer 91 which retains carbon dioxide. The carbon dioxide stored in a carbon dioxide tank 81 is infused in the retention layer 91 by a pump device 83 through the infusion well 87.

In this case, after infusing carbon dioxide in the retention layer 91, it is desirable that carbon dioxide does not extrude to the ground. Therefore, as shown in FIG. 9, a sealing layer 89 which has anticline structure (convex shape to the upper part) is required in the upper part of the retention layer 91. The sealing layer 89 is a stratum which cannot easily pass carbon dioxide, such as clayey layer.

The carbon dioxide infused under the ground does not extrude to the ground by sealing layer 89. However, the stratum which has sealing layer 89 with the upwardly convex shape only exists in the limited places and the suitable place is limited.

Then, as a method also applicable at the place where sealing layer 89 is not anticline structure but monoclinal structure, the method of dissolving carbon dioxide in the stratum water which exists in an underground saltwater aquifer and retaining carbon dioxide efficiently into groundwater is examined.

For example, there is an underground retention method of carbon dioxide which comprises: preparing infusion water by pumping up groundwater of a deep aquifer by a pumping well on the ground; preparing gas-liquid fluid mixture by mixing or dissolving microbubbles of carbon dioxide in the infusion water pressed in the upper part of the infusion well, and pressing the infusion water to the infusion well which reaches the deep aquifer with a pulsating pressure (patent document 1).

Moreover, there is an underground retention system of carbon dioxide gas which uses a carbon dioxide compression apparatus compressing carbon dioxide gas to liquid or supercritical state; compresses a solvent such as sea water by pressurized feeding pump; prepares carbon dioxide dissolving water by dissolving carbon dioxide in the solvent; and presses the generated carbon dioxide dissolving water into the underground aquifer by the infusion well penetrating from the ground to the aquifer (patent document 2).

Moreover, there is an underground retention system of carbon dioxide gas which uses a carbon dioxide compression apparatus compressing carbon dioxide gas to liquid or supercritical state; compresses a solvent such as sea water by pressurized feeding pump; prepares carbon dioxide dissolving water by dissolving carbon dioxide in the solvent; mixes microbubbles of carbon dioxide gas in the generated carbon dioxide dissolving water flowing at the predetermined high velocity, and presses it into the underground aquifer by the infusion well penetrating from the ground to the aquifer (patent document 3).

PRIOR ART DOCUMENTS

Patent Documents

[Patent Document 1] JP 2008-307483 A
[Patent Document 2] JP 2008-238054 A
[Patent Document 3] JP 2010-201330 A

SUMMARY OF THE INVENTION

Problem to be Solved by the Present Invention

However, in the method described in the patent document 1, the stratum water in the aquifer is once pumped up, is made into the gas-liquid mixed state, and is infused into an aquifer again. For this reason, other than the infusion well, the pumping well for pumping up the stratum water and the pump for pumping up the water are required. For this reason, the whole system becomes large-scale. The large power is required for retaining carbon dioxide. The infusion pressure to the aquifer need to balance with the sucking pressure in a pumping well. Since the infused carbon dioxide is controlled by the stream by pumping up and carbon dioxide selectively flows into a part of the aquifer, retention space may not be used effectively.

Moreover, in the apparatus of the patent document 2, the specific gravity of carbon dioxide dissolved water becomes larger than the water in an infusion place. For this reason, carbon dioxide can be retained stably. However, in order to dissolve carbon dioxide in a solvent in a dissolution tub before infusion, equipment such as the pressurized feeding pump or the dissolution tub of the solvent is required. For this reason, the whole system becomes large-scale.

Moreover, in the apparatus of the patent document 3, like the patent document 2, in order to dissolve carbon dioxide in the solvent before the infusion, equipment such as the pressurized feeding pump of the solvent is required. For this reason, the whole system becomes large-scale.

Here, when carbon dioxide is not dissolved in a solvent beforehand, but carbon dioxide is infused in the aquifer, in order to dissolve carbon dioxide in water more efficiently, carbon dioxide need to stay for a long time.

Usually, it is thought that the carbon dioxide infused as bubbles dissolves in surrounding water while going up inside the aquifer. Therefore, staying time of carbon dioxide can be extended by infusing carbon dioxide from the deep part of the aquifer. However, installing the infusion well to the deep part of the aquifer in this way has problems, such as infusion well's installation time.

The present invention has been made in order to deal with such problems, the object of the present invention is to provide a retention device and a retention method that can infuse a retained substance such as carbon dioxide in the underground saltwater aquifer directly, and retain the retained substance in the saltwater aquifer efficiently.

Means for Solving the Problem

In order to attain the aforementioned object, the first invention is a retention device for retaining a retained substance including at least one from carbon dioxide, a substance having larger solubility to water than carbon dioxide, and methane under the ground, comprising: an infusion well reaching to a saltwater aquifer; a pump device pumping the retained substance to the infusion well; and a porous member made of ceramics and placed in the infusion well, wherein: a horizontal well is formed toward a substantially horizontal direction in at least one part of the infusion well inside the saltwater aquifer; the retained substance being pumped into the horizontal well can be infused into the saltwater aquifer through the porous member placed in the horizontal well; the porous member is formed by mixing particles made of ceramics and binder binding the particles and calcining it and a mode of aperture distribution is 4.5 micrometers or less; and microbubbles of the retained substance is generated when the retained substance is infused from the porous member to the saltwater aquifer.

Moreover, it may further comprises a production well reaching to a gas field, an oil field or an oil sand, and gas, oil or heavy oil can be extracted from the production well.

According to the first invention, since the porous member which has an aperture of 4.5 micrometers or less is provided in the horizontal well which infuses a retained substance, the diameter of microbubbles of a retained substance infused through the porous member can become small. For this reason, although details are described later, a descending phenomenon of bubbles in a fluid can be utilized. Therefore, a retained substance can be efficiently dissolved in the saltwater aquifer by making microbubbles stay and descend in the aquifer.

A porous member which has a mode of aperture distribution of 4.5 micrometers or less can be obtained by mixing and calcining particles made of ceramics whose 50% accumulation particle diameter is 4.5 micrometers or less and binder, for example. If such porous member is used, required microbubbles can be generated more certainly.

By installing a horizontal well in part of the infusion well, a retained substance can be infused in wider area of a saltwater aquifer.

Moreover, the retained substance is infused below the horizontal direction from the horizontal well, microbubbles ejected from the horizontal well is infused to the lower part of the saltwater aquifer, and, thereafter, the whole or a part of the microbubbles descend by before described descending phenomenon and the retained substance can descend in the saltwater aquifer. For this reason, the retained substance can stably stay in the saltwater aquifer for a long time. Furthermore, the retained substance may be infused above the horizontal direction and may be infused to whole circumference (all directions) of the horizontal well. In any case, by the descending phenomenon of the whole or a part of microbubbles, the retained substance can stably stay in the saltwater aquifer.

While oil etc. is extracted through the production well from the gas field etc., by infusing mixture of the retained substance and water extracted with oil etc., the oil etc. is enhanced recovered while retaining the retained substance. In this case, by infusing a retained substance in a gas field, an oil field or an oil sand, microbubbles of the retained substance, and gas, oil or heavy oil can become the dissolution or suspension state.

The second invention is a retention method for retaining a retained substance including at least one from carbon dioxide, a substance having larger solubility to water than carbon dioxide, and methane under the ground, comprising: using a retention device for retaining the retained substance comprising an infusion well reaching to a saltwater aquifer, a pump device pumping the retained substance to the infusion well, and a porous member made of ceramics and placed in the infusion well; forming a horizontal well toward a substantially horizontal direction in at least one part of the infusion well in the saltwater aquifer; generating microbubbles of the retained substance when the retained substance is infused through the porous member to the saltwater aquifer; and making the microbubbles descend in the saltwater aquifer, wherein the porous member is formed by mixing particles made of ceramics and binder binding the particles and calcining it and a mode of aperture distribution is 4.5 micrometers or less.

The retention device may further comprise a production well reaching to a gas field, an oil field or an oil sand. By infusing the retained substance under the ground through the infusion well, gas, oil or heavy oil and the retained substance become suspension state and gas, oil or heavy oil can be extracted from the production well.

According to the 2nd invention, a diameter of the retained substance infused through the porous member can become small, and the descending phenomenon of bubbles in fluid can be utilized. Therefore, the retained substance can be efficiently dissolved in the saltwater aquifer by making microbubble stay and descend in the aquifer. Especially, the retained substance can stay in the saltwater aquifer for a long time by infusing a retained substance below horizontal direction combined with an effect of a descending phenomenon. Enhanced recovery of oil etc. can be performed while retaining the retained substance under the ground.

Effect of the Invention

According to the present invention, a retention device for a retained substance and a retention method for retained substance that can directly infuse the retained substance in the underground saltwater aquifer and efficiently retain the retained substance in the underground saltwater aquifer are provided.

BRIEF DESCRIPTION OF THE DRAWINGS

FIG. 6 (a) A figure showing the generation status of a microbubble 75

FIG. 6 (b) A schematic diagram showing the generation status of a microbubble 75

FIG. 7 (a) A figure showing the descending phenomenon of a microbubble 75

FIG. 7 (b) A schematic diagram showing the descending phenomenon of a microbubble 75

FIG. 8 A figure showing a carbon dioxide retention device 1a

BEST MODE FOR CARRYING OUT THE INVENTION

Figure 1:
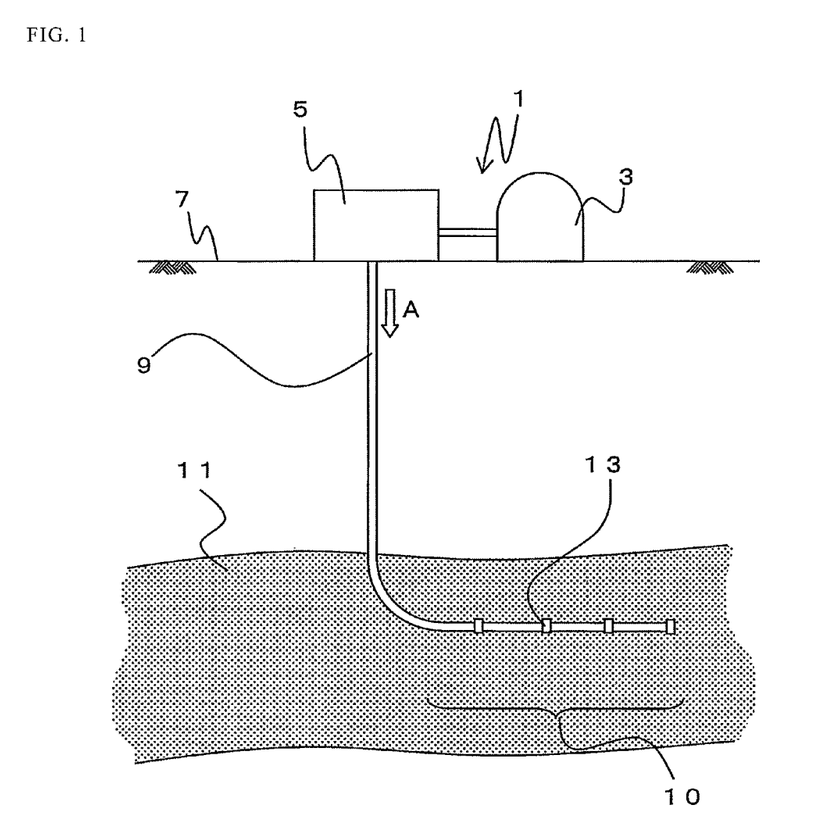
FIG. 1 A figure showing a carbon dioxide retention device 1

Hereafter, an embodiment of the invention is described in detail. FIG. 1 is a figure showing a carbon dioxide retention device 1 concerning this embodiment. The carbon dioxide retention device 1 mainly comprises a carbon dioxide tank 3, a pump device 5, an infusion well 9, a filter 13, etc. In the following embodiments, carbon dioxide is used as an example of a retained substance. However, acetylene, ammonia, sulfur dioxide, hydrogen chloride, chlorine, and hydrogen sulfide that have larger solubility to water than carbon dioxide, and flare gas such as methane are similar.

The carbon dioxide emitted from the factory etc. is collected and stored in the carbon dioxide tank 3. When a carbon dioxide source adjoins, storing is performed by connecting a plumbing etc. to the carbon dioxide tank 3 directly.

The carbon dioxide tank 3 is connected with the pump device 5. The pump device 5 comprises a pump, a pressure regulation valve, a valve, a temperature regulator, etc. that are omitted in the figure. The infusion well 9 which is a tube is connected to the pump device 5. The infusion well 9 is provided to extend beneath the ground 7 and reaches to a saltwater aquifer 11. The saltwater aquifer 11 is a stratum which exists under the ground with sand, gravel, etc. A sealing layer (what is called cap rock) which is omitted in the figure exists in the upper part of the saltwater aquifer 11.

A horizontal well 10 is formed in a part of the infusion well 9 (a part located in the inside of the saltwater aquifer 11) toward a substantially horizontal direction. Hence, the horizontal well 10 is a part of the infusion well 9 formed toward the substantially horizontal direction in the saltwater aquifer 11.

Two or more filters 13 as porous members are provided in a part of the axial direction of the horizontal well 10. For example, the member which is formed by mixing and calcining particles made of ceramics and binder which binds the particles can be used as the filter 13. The smaller the aperture of the filter 13 becomes, the smaller the diameter of the generated microbubble becomes.

Here, these inventors found out that even if a bubble usually rises in fluid, by making the diameter of a bubble small, a bubble descends in the same fluid. Hence, the phenomenon wherein the microbubble descends in water by generating the microbubble of carbon dioxide smaller than a predetermined diameter in water was discovered.

In order to generate the microbubble below the predetermined diameter, for the especially preferable filter 13, the mode of aperture distribution of a porous member is 4.5 micrometers or less.

The carbon dioxide stored in the carbon dioxide tank 3 is fed by the pump device 5. The pump device 5 sends the carbon dioxide stored in the carbon dioxide tank 3 into the infusion well 9 (the horizontal well 10) with a pump. On this occasion, the pump device 5 can feed carbon dioxide in the state of specified pressure and specified temperature by the pressure regulation valve, a temperature regulator, etc.

Furthermore, although the pump device 5 can feed carbon dioxide in a supercritical state for example, even if carbon dioxide is gas, liquid, or mixed state, this device can have the same effect. For example, carbon dioxide temperature is 20 to 40° C., and pressure is 2 to 10 MPa as feeding conditions for carbon dioxide. This is the conditions suitable for retaining carbon dioxide into 200 to 1000 m depth, for example. The carbon dioxide in such conditions is transferred through the infusion well 9 toward the direction of arrow A, passes filter 13 provided in the horizontal well 10, and is infused in the saltwater aquifer 11.

Figure 2:
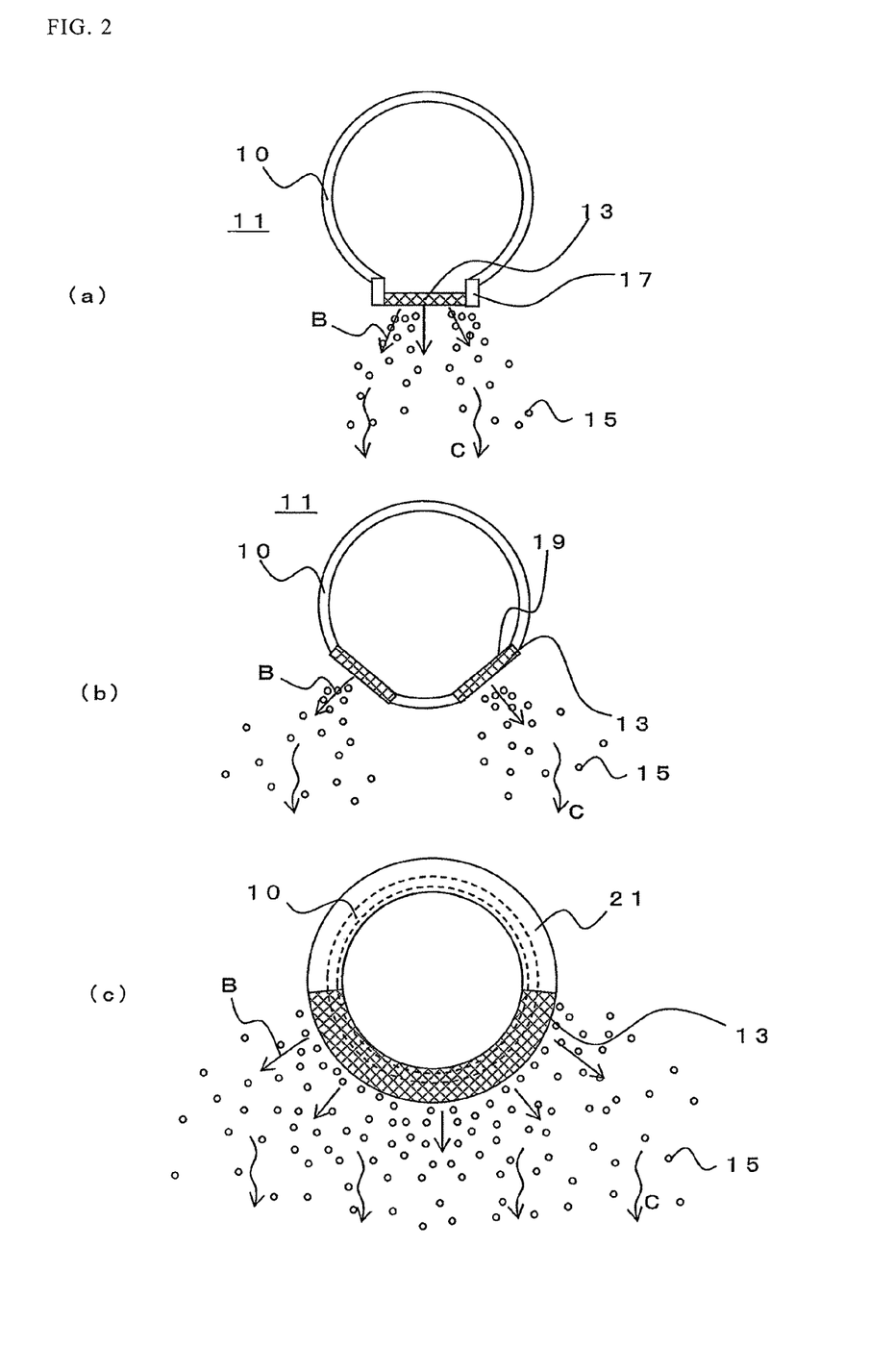
FIG. 2 An enlarged figure of neighborhood of a filter 13

FIG. 2 (*a*) is a sectional view of the filter 13 of the horizontal well 10. As shown in FIG. 2 (*a*), a nozzle 17 is provided in a horizontal well 10, and the filter 13 is provided in the nozzle 17. The nozzle 17 is placed toward the downward direction of the horizontal well 10. The carbon dioxide which flows inside is ejected through the filter 13 to the saltwater aquifer 11. When carbon dioxide is ejected to the saltwater aquifer 11, a microbubble of carbon dioxide is formed by the filter 13.

Carbon dioxide infused in as a microbubble 15 in the saltwater aquifer 11 is ejected toward the direction of the nozzle 17 (Arrow B in the figure), after that, the whole or a part of microbubbles descend according to the descending phenomenon (Arrow C in the figure). The microbubble 15 dissolves in the saltwater aquifer 11 during stay by surfacing or descending. Thus, staying time of carbon dioxide in the saltwater aquifer 11 can be extended by making carbon dioxide into the microbubble 15 which has a diameter below the predetermined diameter. Moreover, since a contact area per unit quantity with the saltwater aquifer 11 can be enlarged, the dissolution of carbon dioxide to the saltwater aquifer 11 can progress very efficiently.

Since the microbubble 15 descends toward the lower part of the saltwater aquifer 11, even if carbon dioxide is infused in the upper part of the saltwater aquifer 11, the retention space of the saltwater aquifer 11 can be used effectively. The carbon dioxide which dissolves in the saltwater aquifer 11 while moving slowly in the inside of the saltwater aquifer 11 forms compounds, such as carbonate, by a chemical reaction with the rock mineral etc. existing in the circumference of the saltwater aquifer 11. Therefore, carbon dioxide can be fixed not only in the saltwater aquifer but also as a carbonic acid compound under the ground or the seabed.

Furthermore, as shown in FIG. 2 (*b*), the filter 13 may be directly attached to the horizontal well 10 not using a nozzle. In this case, a hole 19 may be formed in the predetermined position of the horizontal well 10, and the filter 13 is fixed to the hole 19. The filter 13 may be formed toward two or more directions from the horizontal well 10 (2 directions in the figure). Even in this case, the filter 13 should be provided towards a lower part (below the horizontal direction). It is because staying time of the microbubble 15 can be extended according to the descending phenomenon of the microbubble 15.

The filter 13 may be formed in a ring member 21 as shown in FIG. 2 (*c*). The ring member 21 is fixed to a part of the horizontal well 10, and the inner surface of ring member 21 should just touch the interior space of the horizontal well 10. In this case, only the lower part (below the horizontal direction) of ring member 21 is used as the filter 13, and other parts (above the horizontal direction) is made of metal etc., the microbubble 15 can be ejected toward the downward direction. Therefore, staying time of the microbubble 15 can be extended according to the descending phenomenon of the microbubble 15.

As mentioned above, in the present invention, any kind of installation mode of the filter 13 is sufficient. For example, although it is preferable to place the filter 13 in a part (the lower part) of circumferential direction of the horizontal well 10, and to eject microbubbles below the horizontal direction from a part of the horizontal well 10, the filter 13 may be placed in the upper part of circumferential direction of the horizontal well 10 and microbubbles may eject toward upward.

Figure 3:
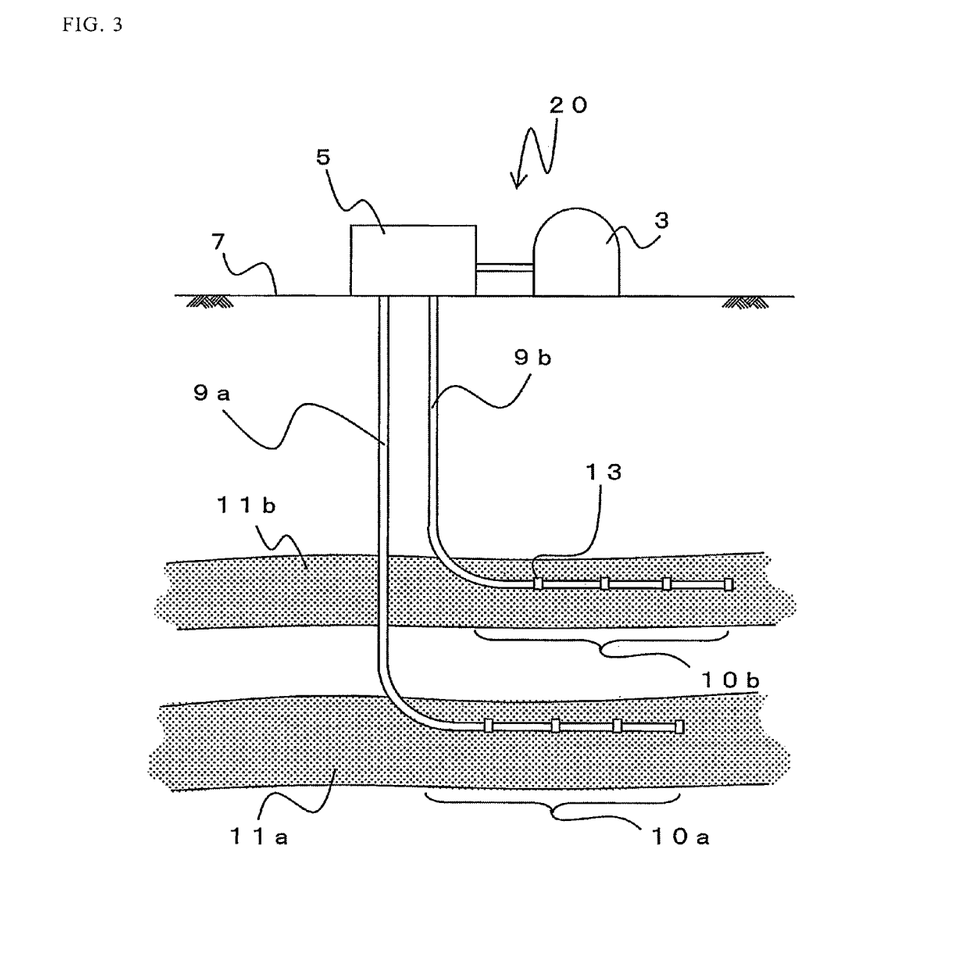
FIG. 3 A figure showing a carbon dioxide retention device 20

Next, other embodiments of the retaining method of the carbon dioxide according to the present invention are described. FIG. 3 is a figure showing a carbon dioxide retention device 20. In following embodiments, the same number as FIG. 1 is given to the component which performs the same function in the carbon dioxide retention device 1 shown in FIG. 1, and the repeated explanation is omitted.

The carbon dioxide retention device 20 differs from the carbon dioxide retention device 1 in that two or more infusion wells 9a and 9b are provided. When alternation of sand and mud in which a low pervious mudstone layer and a high pervious sandstone layer exist by turns is formed under the ground, the infusion wells 9a and 9b are provided respectively so that they may reach to each two or more sandstone layers in which saltwater aquifers 11a and 11b exist.

Horizontal wells 10a and 10b are provided for the infusion wells 9a and 9b, respectively. The carbon dioxide retention device 20 can infuse carbon dioxide simultaneously or individually to the saltwater aquifers 11a and 11b by respective horizontal wells 10a and 10b. Therefore, carbon dioxide can be efficiently infused into the saltwater aquifers 11a and 11b.

Figure 4:
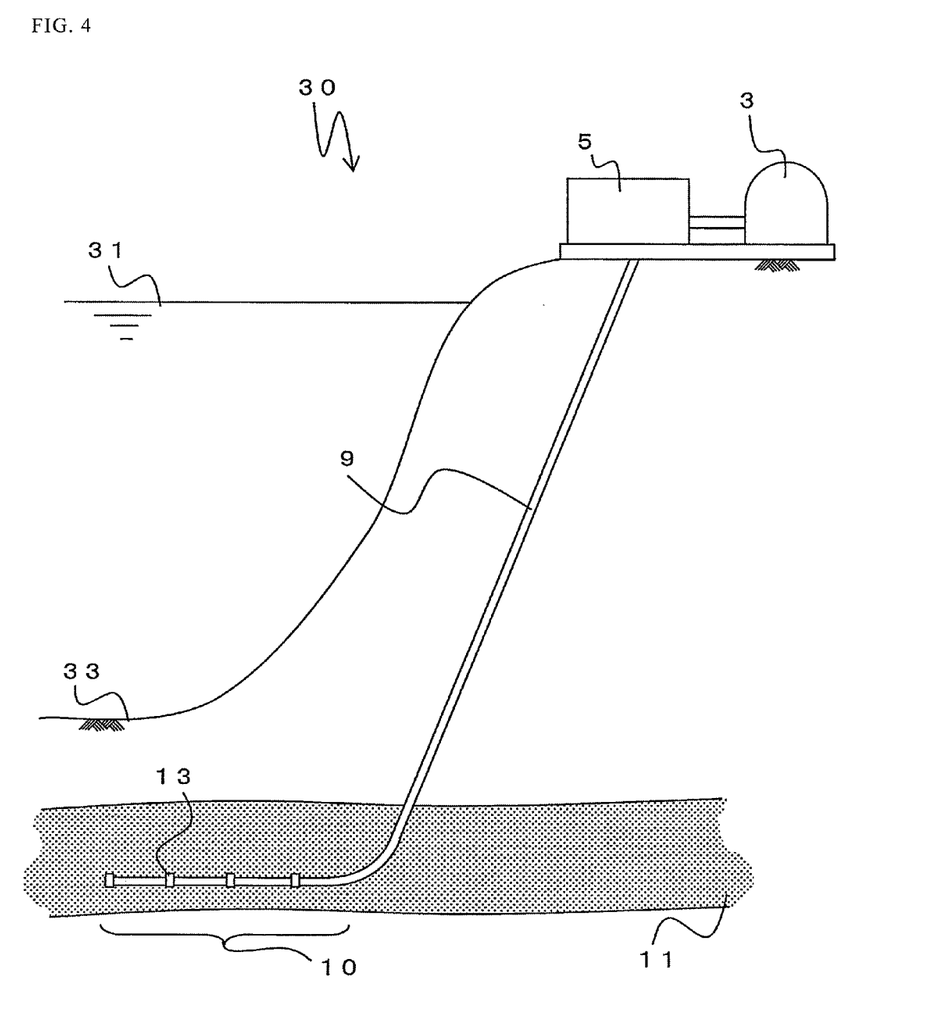
FIG. 4 A figure showing a carbon dioxide retention device 30

FIG. 4 is a figure showing a carbon dioxide retention device 30. The carbon dioxide retention device 30 differs in that it retains below the seabed 33 from the carbon dioxide retention device 1. In order to retain carbon dioxide efficiently to the saltwater aquifer 11 which exists under the seabed 33, the carbon dioxide retention device 30 is provided on the ground. On this occasion, the infusion well 9 inclines, and its tip becomes the horizontal well 10. The carbon dioxide retention device 30 can retain carbon dioxide efficiently to the saltwater aquifer 11 under the seabed 33. A pump device may be installed on the seabed.

EXAMPLE

Figure 5:
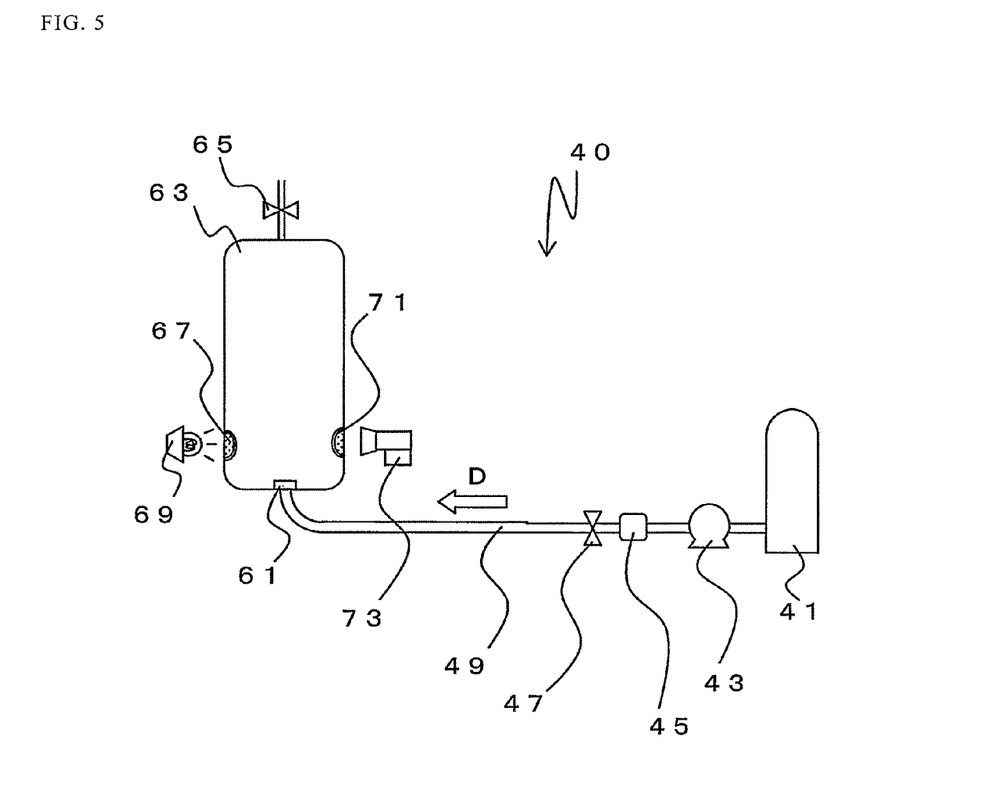
FIG. 5 A figure showing a carbon dioxide retention test equipment 40

Regarding to the retaining method of carbon dioxide according to the present invention, the generation state of a microbubble was checked FIG. 5 is a figure showing a carbon dioxide retention test equipment 40.

The carbon dioxide retention test equipment 40 comprises a carbon dioxide tank 41, a pressure regulation valve 45, a syringe pump 43, a pressure vessel 63, etc.

Carbon dioxide is stored in the carbon dioxide tank 41. The syringe pump 43, the pressure regulation valve 45, and a valve 47 are connected to the carbon dioxide tank 41 by a pipe 49. The syringe pump 43 feeds carbon dioxide to the pressure vessel 63. Carbon dioxide can be adjusted to arbitrary pressure by the pressure regulation valve 45, and the temperature regulator which is omitted in the figure can adjust the carbon dioxide fed to the pressure vessel 63 to arbitrary temperature.

By adjusting the valve 47, carbon dioxide simple substance or carbon dioxide can be fed to the pressure vessel 63 (the direction of arrow D in the figure).

The filter 61 is provided in the junction of the pressure vessel 63 and the plumbing 49. The filter 61 is the disc-like shape of 5 mm in thickness and 50 mm in diameter. For example, the filter 61 can be replaced so as to perform examinations with changing its aperture.

A lighting window 67 and a photographing window 71 are provided at the sides that face mutually in the pressure vessel 63. The lighting window 67 and the photographing window 71 are transparent windows, and we can check an internal situation. From the lighting window 67, the inside is irradiated by a lighting 69 installed outside. A camera 73 is installed in the outside of the photographing window 71 provided in the position which faces the lighting window 67. The camera 73 can photograph the state in the pressure vessel 63 illuminated by the lighting 69. The camera 73 is a high speed camera and can know the state of the carbon dioxide which passed the filter 61 and was infused in the pressure vessel 63.

The pressure vessel 63 is filled with the predetermined pressurized water. A blowdown valve 65 is provided in the pressure vessel 63. The blowdown valve 65 functions to keep the pressure in the pressure vessel 63 at fixed pressure, even if carbon dioxide is infused into the pressure vessel 63. Hence, if the pressure rises by the infused carbon dioxide, in order to keep the increased pressure at steady state, internal water etc. will be discharged. The water in the pressure vessel 63 corresponds to an imitation of the saltwater aquifer.

By using the carbon dioxide retention test equipment 40, the state of the carbon dioxide infused into the pressure vessel 63 in the various states was observed. As the filter 61, vitrified whetstones which have an aperture (standard) of 11 micrometers and 4.5 micrometers were used.

As a test condition, a temperature of water is changed in two levels of 20° C. and 40° C., an infusion pressure of carbon dioxide is changed in three levels of 6 MPa, 8 MPa, and 10 MPa, an infusion rate is changed in three levels of 0.1 cc/min, 1.0 cc/min, and 5.0 cc/min and sea water concentration in the pressure vessel is changed in three levels of 0% (pure water), 50%, and 100%, and the states of microbubbles were checked, respectively.

Moreover, the condition with pressure of 6 MPa assumes that the retention depth is 600 m, and the condition with pressure of 8 MPa assumes that the retention depth is 800 m.

Figure 6A:
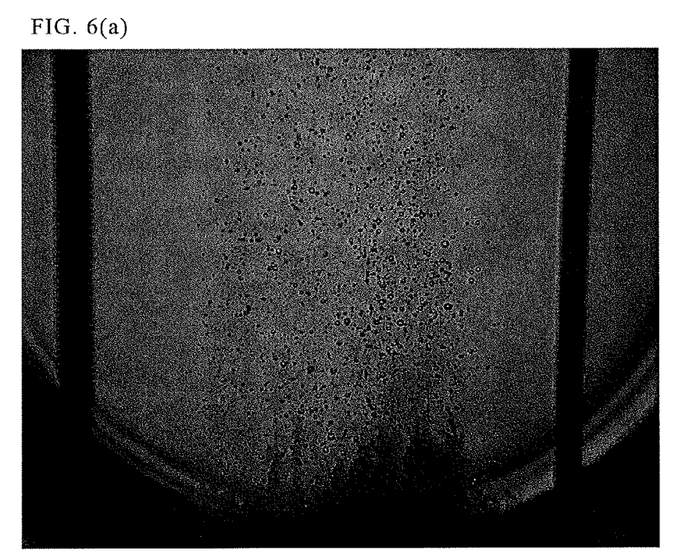
Figure 6B:
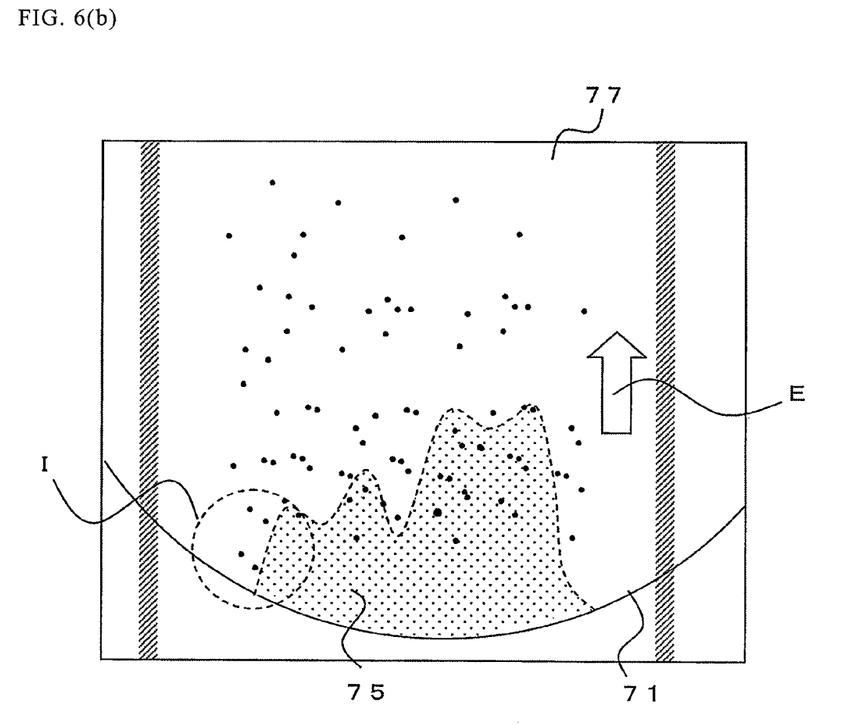

Generation of microbubbles was also confirmed in every condition. FIG. 6 (a) and FIG. 6 (b) show the example of the microbubble when vitrified whetstone whose aperture (standard) is 4.5 micrometers is used as the filter 61 in the conditions of 40° C., 10 MPa, 5.0 cc/min, and 0% (pure water) of sea water concentration. FIG. 6 (a) shows the image photographed by the camera 73, and FIG. 6 (b) is a schematic diagram of FIG. 6 (a).

If carbon dioxide is infused from the lower part of the pressure vessel 63 as shown in FIG. 6 (b), carbon dioxide will be ejected toward the direction of arrow E in the water in the pressure vessel 63. On this occasion, although some bubbles were formed, a very fine microbubble 75 was confirmed. It is observed that some of microbubbles 75 disappear while going to the upper part of pressure vessel 63. This is because the carbon dioxide which becomes a microbubble dissolved in the water 77.

Figure 7A:
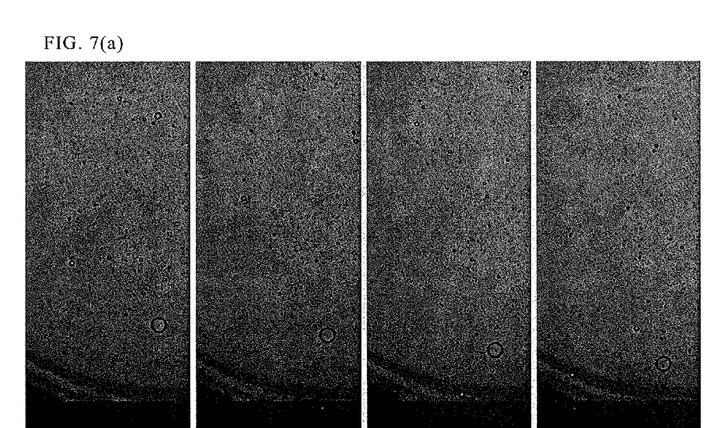
Figure 7B:
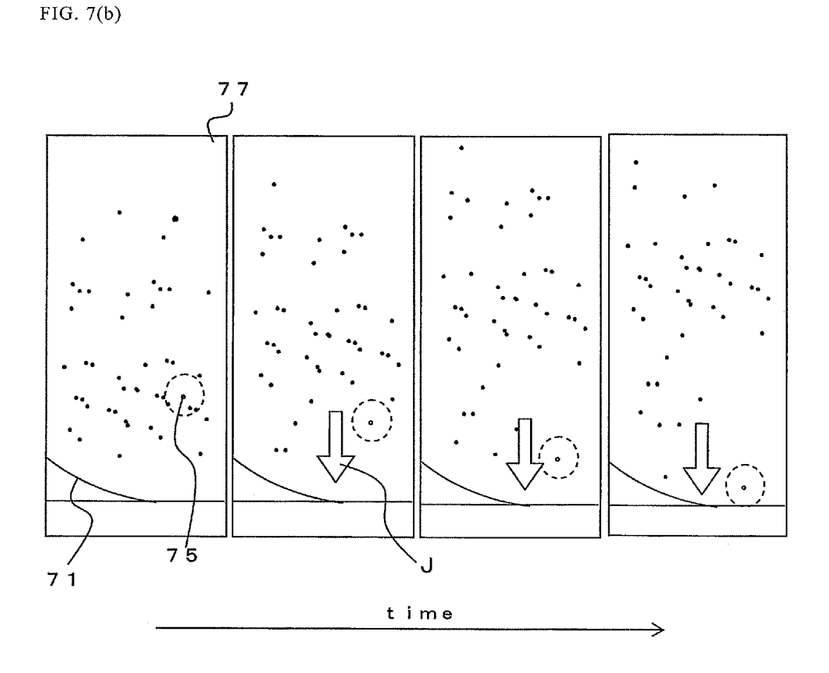

FIG. 7 (a) and FIG. 7 (b) are enlarged drawings of the section I of FIG. 6 (b). FIG. 7 (a) shows the image photographed by camera 73, and FIG. 7 (b) is a schematic diagram of FIG. 7 (a). Each four figures shows time progress from the left to the right, and are photographed at intervals of 0.34 sec.

As shown in FIG. 7 (b), a very fine microbubble 75 was confirmed when the aperture of the filter is set to 4.5 micrometers. The phenomenon in which this microbubble (mean diameter of 4.5 micrometers) descends below with progress of time was confirmed (the direction of arrow J in the figure). Hence, although other comparatively big bubbles (including microbubble) rise up, the microbubbles (including nanobubbles) with small diameter below predetermined value descend in the water without rising.

Such a descending phenomenon is based on the rapid dissolution of carbon dioxide. The density of water increases because carbon dioxide dissolves in water. For this reason, the density distribution of water occurs, and the convection of the water, in which carbon dioxide dissolves, to the lower part occurs. On this occasion, the smaller the diameter of a bubble becomes, the larger the influence by this convection becomes. It is considered that the bubble is carried downward by the convection of water. Hence, when a microbubble has the diameter below predetermined diameter (for example, 4.5 micrometers or less), the microbubble can descend inside the saltwater aquifer. Thereby, carbon dioxide can be retained in the saltwater aquifer at high efficiency.

According to the embodiment of the invention, carbon dioxide can become a microbubble effectively in a saltwater aquifer by infusing carbon dioxide to the saltwater aquifer through the whetstone filter which is a porous member. On this occasion, the descending phenomenon of a microbubble can be utilized by generating a microbubble using a filter whose aperture is below 4.5 micrometers.

For this reason, the microbubble of carbon dioxide can stay in a saltwater aquifer for longer time. Especially, by generating a microbubble downward, the staying time of the microbubble is secured enough, and carbon dioxide can be efficiently dissolved in the saltwater aquifer.

As mentioned above, although the embodiment of the invention was described referring to attached figures, the technical scope of the present invention is not influenced by the embodiment mentioned above. It should be understood that a person skilled in the art can attain examples of various changes and modifications within the realm of the technical idea of the present invention, and such examples should obviously be included in the technical scope of the present invention.

Figure 8:
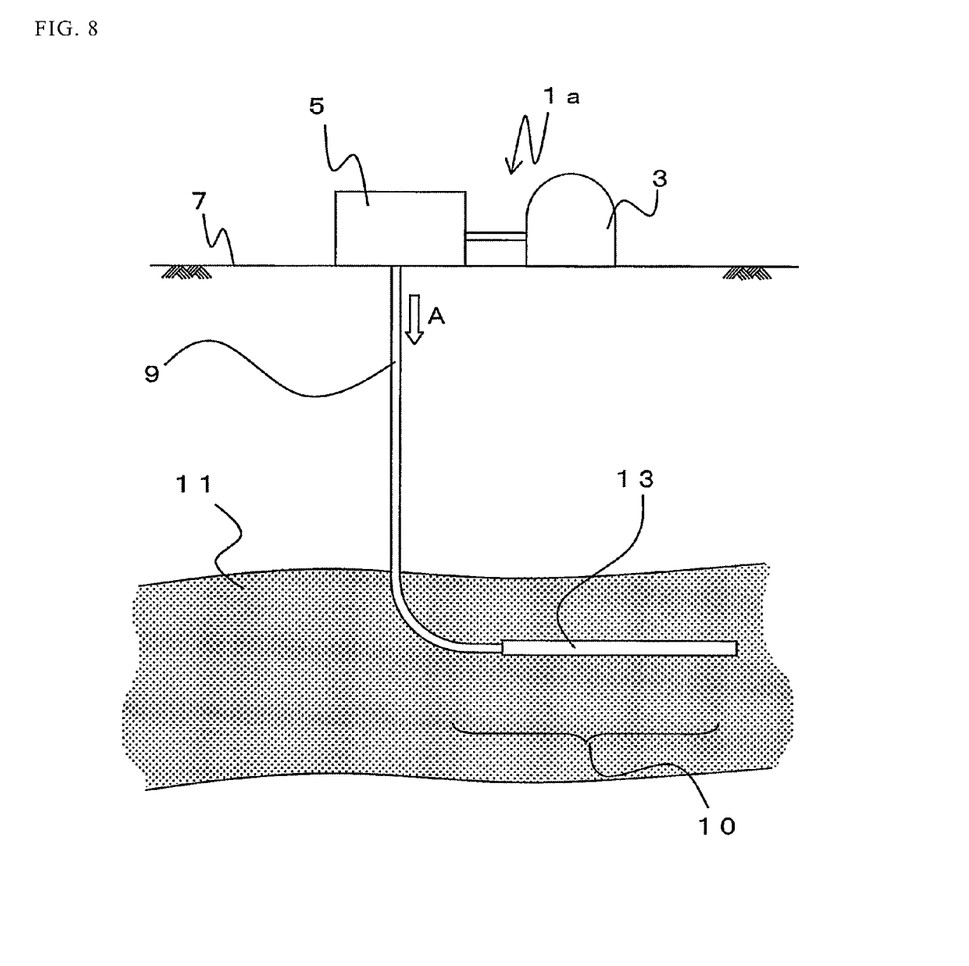

For example, a carbon dioxide retention device $1a$ as shown in FIG. 8 is also applicable. In the carbon dioxide retention device $1a$, the filter 13 is provided over approximately full length of the horizontal well 10. Thereby the area of the filter 13 can be enlarged. For this reason, more carbon dioxide can be infused into the saltwater aquifer 11 in the state with less pressure loss. In the above-mentioned example, although the filter 13 was formed in a part of circumference direction of the horizontal well, it may form all over the circumference. Hence, the mode of the filter 13 is suitably installed so that carbon dioxide can be efficiently infused into the saltwater aquifer 11. Naturally such mode is applicable to the other carbon dioxide retention devices 20 and 30.

By providing a production well which reaches a gas field, an oil field, an oil sand, etc., and infusing carbon dioxide under the ground by the infusion well, the production well can perform enhanced recovery of gas, oil, heavy oil, etc. In the present enhanced recovery method of gas, oil, heavy oil, etc., high-pressure carbon dioxide which can make oil etc. and carbon dioxide to dissolution or suspended state is pressed, and enhanced recovery is performed by mixing the oil etc. to be extracted and carbon dioxide. However, originally, carbon dioxide and oil etc. cannot easily become the dissolution or suspended state, enhanced recovery can only be performed by pressing carbon dioxide to a gas field, an oil field, an oil sand, etc. that exist in a quite deep place which can keep the pressure in which carbon dioxide and oil etc. become the dissolution or suspended state. By applying the present invention to such enhanced recovery, the pressed carbon dioxide becomes minute bubbles, and carbon dioxide and oil etc. become the dissolution or suspended state much more easily by the lower pressure than before. By applying the present invention to such enhanced recovery, enhanced recovery of gas, oil, heavy oil, etc. can be performed also in the gas field, an oil field, an oil sand, etc. in the comparatively shallow range where carbon dioxide and oil etc. cannot become the dissolution or suspended state easily until now and the enhanced recovery was not achieved before.

Moreover, in this case, after collecting oil etc. from the mixture of the oil etc. and water which were extracted by the production well, the remaining water is mixed with carbon dioxide and infused under the ground, and the water extracted excessively can be returned under the ground. For this reason, while controlling land subsidence etc., carbon dioxide can be efficiently infused in a saltwater aquifer.

The descending phenomenon of carbon dioxide can occur more efficiently by making a molecule heavier than carbon dioxide mix with carbon dioxide.

DESCRIPTION OF NOTATIONS

1, $1a$, 20, 30 Carbon dioxide retention device
3 Carbon dioxide tank
5 Pump device
7 Ground
9 Infusion well
10 Horizontal well
11 Saltwater aquifer
13 Filter
15 Microbubble
17 Nozzle
19 Hole
21 Ring member
31 Sea surface
33 Seabed
40 Carbon dioxide retention test equipment
41 Carbon dioxide tank
43 Syringe pump
45 Pressure regulation valve
47 Valve
49 Plumbing
61 Filter
63 Pressure vessel
65 Blowdown valve
67 Lighting window
69 Lighting
71 Photographing window
73 Camera
75 Macrobubble
77 Water
80 Carbon dioxide retention apparatus
81 Carbon dioxide tank
83 Pump device
85 Ground
87 Infusion well
89 Sealing layer
91 Retention layer

The invention claimed is:

1. A retention device for retaining a retained substance including at least one from carbon dioxide, a substance having larger solubility to water than carbon dioxide, and methane under the ground, comprising:

an infusion well reaching to a saltwater aquifer;
a pump device that pumps the retained substance to the infusion well;
a horizontal well that is formed toward a substantially horizontal direction in at least one part of the infusion well inside the saltwater aquifer;
a porous member that (i) is provided in a lower part of the horizontal well, (ii) is formed by mixing and calcining particles made of ceramics and binder, and (iii) has a mode of aperture distribution of 4.5 micrometers or less; and
a ring member fixed in the horizontal well, the ring member comprising:
an upper part composed of metal; and
a lower part (i) is mounted to the upper part and (ii) carries the porous member between an inner surface of the ring member facing an interior of the horizontal well and an outer surface of the ring member opposite the inner surface,
wherein the retained substance is pumped into the horizontal well and infused into the saltwater aquifer through the porous member, and wherein microbubbles of the retained substance are generated when the retained substance is infused from the porous member to the saltwater aquifer.

2. The retention device for retaining the retained substance according to claim 1, wherein:
a single or multiple porous members are formed toward two or more directions below the horizontal well.

3. The retention device for retaining the retained substance according to claim 1, further comprising a production well reaching to a gas field, an oil field or an oil sand,
wherein gas, oil or heavy oil can be extracted from the production well.

4. The retention device for retaining the retained substance according to claim 2, further comprising a production well reaching to a gas field, an oil field or an oil sand,
wherein gas, oil or heavy oil can be extracted from the production well.

5. The retention device for retaining the retained substance according to claim 1, further comprising a production well reaching to a gas field, an oil field or an oil sand,
wherein gas, oil or heavy oil can be extracted from the production well.

6. A retention method for retaining a retained substance including at least one from carbon dioxide, a substance having larger solubility to water than carbon dioxide, and methane under the ground, comprising:
using a retention device for retaining the retained substance comprising an infusion well reaching to a saltwater aquifer, a pump device pumping the retained substance to the infusion well, and a porous member made of ceramics and placed in the infusion well;
forming a horizontal well toward a substantially horizontal direction in at least one part of the infusion well in the saltwater aquifer;
generating microbubbles of the retained substance when the retained substance is infused through the porous member to the saltwater aquifer; and
making the microbubbles descend in the saltwater aquifer, wherein the porous member (i) is provided in a lower part of the horizontal well, (ii) is formed by mixing particles made of ceramics and binder, and (iii) has a mode of aperture distribution is distribution of 4.5 micrometers or less, and wherein a ring member fixed in the horizontal well comprises:
an upper part composed of metal; and
a lower part that (i) is mounted to the upper part and (ii) carries the porous member between an inner surface of the ring member facing an interior of the horizontal well and an outer surface of the ring member opposite the inner surface.

7. The retention method for retaining the retained substance according to claim 6, wherein:
a single or multiple porous members are formed toward two or more directions below the horizontal well.

8. The retention method for retaining the retained substance according to claim 6, wherein:
the retention device further comprises a production well reaching to a gas field, an oil field or an oil sand;
gas, oil or heavy oil and the retained substance become suspension state by infusing the retained substance under the ground through the infusion well; and
gas, oil or heavy oil can be extracted from the production well.

9. The retention method for retaining the retained substance according to claim 7, wherein:
the retention device further comprises a production well reaching to a gas field, an oil field or an oil sand;
gas, oil or heavy oil and the retained substance become suspension state by infusing the retained substance under the ground through the infusion well; and
gas, oil or heavy oil can be extracted from the production well.

10. The retention method for retaining the retained substance according to claim 6, wherein:
the retention device further comprises a production well reaching to a gas field, an oil field or an oil sand;
gas, oil or heavy oil and the retained substance become suspension state by infusing the retained substance under the ground through the infusion well; and
gas, oil or heavy oil can be extracted from the production well.

* * * * *